July 21, 1964 E. H. PETREE ETAL 3,141,492

APPARATUS FOR FORMING LEADS ATTACHED TO COMPONENTS

Filed Jan. 31, 1962 2 Sheets-Sheet 1

INVENTORS

Edwyn H. Petree

Frederick E. Robbins

Robert L. Self,

BY R. P. Miller

ATTORNEY

July 21, 1964 E. H. PETREE ETAL 3,141,492

APPARATUS FOR FORMING LEADS ATTACHED TO COMPONENTS

Filed Jan. 31, 1962 2 Sheets-Sheet 2

INVENTORS

Edwyn H. Petree
Frederick E. Robbins
Robert L. Self,

BY R. P. Miller

ATTORNEY

United States Patent Office
3,141,492
Patented July 21, 1964

3,141,492
APPARATUS FOR FORMING LEADS ATTACHED TO COMPONENTS

Edwyn H. Petree, Frederick E. Robbins, and Robert L. Self, all of Burlington, N.C., assignors to Western Electric Company, Incorporated, New York, N.Y.
Filed Jan. 31, 1962, Ser. No. 170,861
15 Claims. (Cl. 153—2)

This invention relates to an apparatus for forming leads attached to components and more particularly to apparatus for cutting and crimping terminal lead wires extending from electrical components to secure the components to a module.

In the manufacture of components, it is sometimes necessary to form leads attached to the components. More particularly, in the manufacture of components such as resistors, capacitors, relays, and the like, it is necessary to cut and crimp terminal lead wires to secure and electrically connect the components to a module such as a printed circuit panel, terminal board, circuit mounting, etc. In the past, when attempts have been made to secure components to modules by cutting and crimping the lead wires in a common direction, the components have not been locked securely to the panel by the crimped leads.

Research indicates that the components are securely locked to the module when the terminal leads are crimped in succession in opposite directions.

An object of this invention is to provide a new and improved apparatus for forming leads attached to components.

Another object of this invention is to provide apparatus for cutting and crimping terminal lead wires extending from electrical components to secure the components to a module.

A further object of this invention resides in the provision of facilities actuated in seriatim for successively crimping lead wires extending from a component.

A still further object of this invention is to provide instrumentalities for holding a module so that component lead wires extend through the module for engagement with facilities for successively crimping the lead wires against the module in opposite directions.

With these and other objects in view, the present invention contemplates an apparatus for cutting and crimping a plurality of pairs of terminal lead wires of components that are mounted on a module. The apparatus includes a pair of overlying cutting and crimping slides. The module and the mounted components are loaded in a holder secured to the lower slide. Movement is imparted to the upper slide whereupon the first terminal lead wire of each pair of terminal lead wires is cut and crimped in a first direction. Movement of the upper slide is arrested, whereupon the lower slide and the module are moved relative to the upper slide so that the second terminal lead wire of each pair is cut and crimped in a second or opposite direction.

A complete understanding of this invention may be had by reference to the following detailed description when read in conjunction with the accompanying drawings illustrating a preferred embodiment thereof, wherein.

Figures 3, 4, 5, 6A, 6B, 6C, 7A, 7B, 7C, 8, 9:
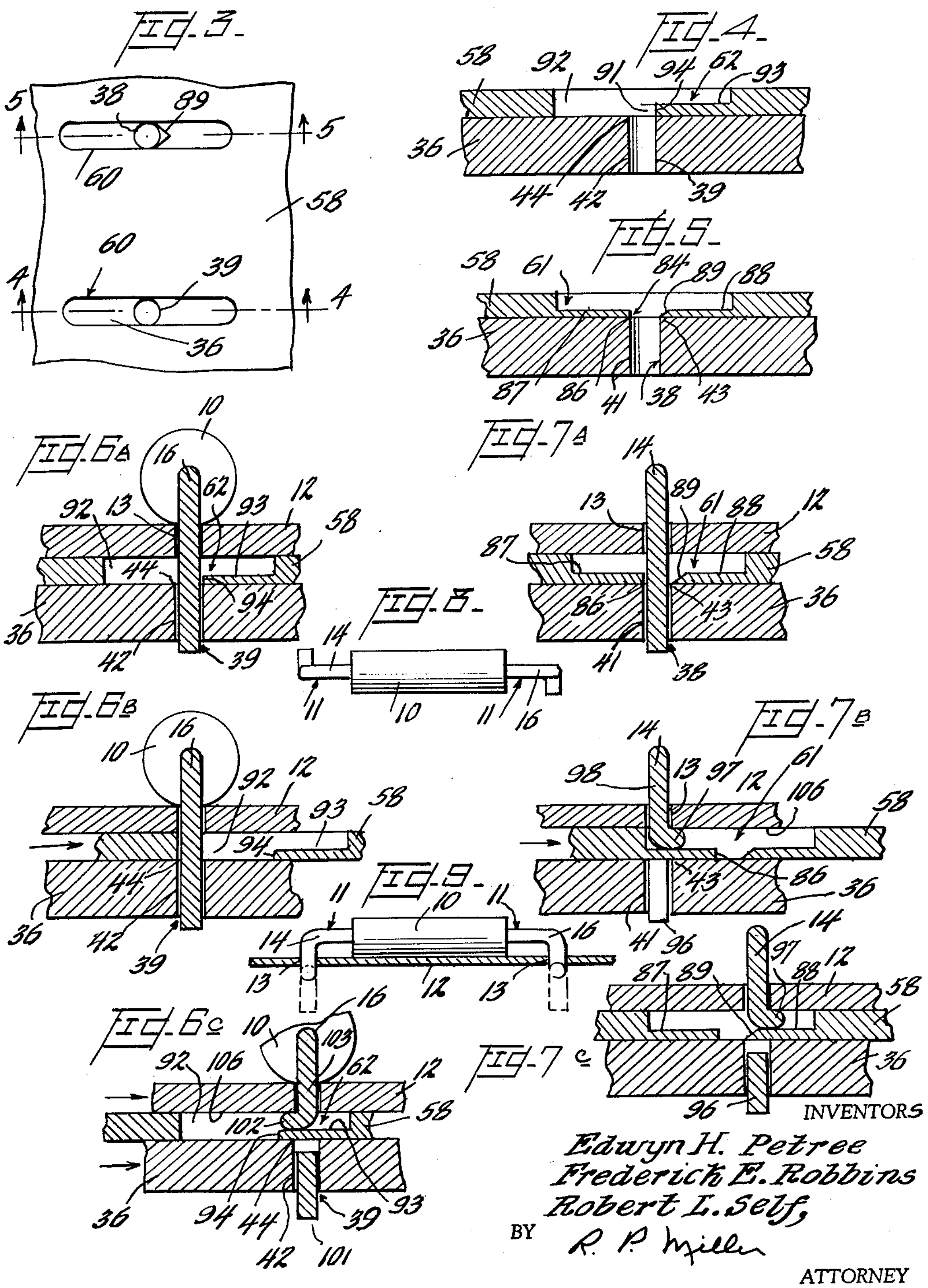
FIG. 3 is a plan view of the disclosure of FIG. 2 wherein a module clamp, module, and components are removed to expose a pair of spaced cutting and crimping dies formed in the slides.
FIG. 4 is an elevational cross-sectional view taken on line 4—4 of FIG. 3 showing a slot and a crimping section of a crimping die adjacent to a cutting die.
FIG. 5 is an elevational cross-sectional view taken on line 5—5 of FIG. 4 showing a crimping section and a crimp retaining lip provided in a second crimping die.
FIGS. 6A through 6C are cross-sectional views of the disclosure of FIG. 4 showing successive positions of the slides and the module during a cutting and crimping operation.
FIGS. 7A through 7C are cross-sectional views of the disclosure of FIG. 5 showing the relative positioning of the slides and the module during the cutting and crimping operation.
FIG. 8 is a plan view of a component showing the terminal lead wires crimped in opposite directions by the apparatus shown in the other views.
FIG. 9 is an elevational view of the component showing the cut and crimped terminal lead wires locking the component to the module.

Referring first to FIGS. 8 and 9, an article which may be fabricated by the forming apparatus shown in the other views, is a component 10 such as a resistor, capacitor, relay, etc. The component 10 may be provided with facilities such as a pair of legs or terminal lead wires 11 for electrically connecting and mechanically securing the component to a module 12 such as a panel circuit mounting, printed circuit board, etc.

The component 10 may be mounted on the panel 12 so that the pairs of terminal lead wires 11 extend through pairs of apertures 13 provided in the panel (see dotted lines in FIG. 9). Upon loading the panel 12 with the mounted components 10 in the forming apparatus, a first wire 14 of each pair of terminal lead wires 11 is cut and crimped in a first direction (FIG. 8) whereupon a second wire 16 of each pair of terminal lead wires 11 is cut and crimped in a second or opposite direction to secure the component 10 to the panel 12.

Figure 1:
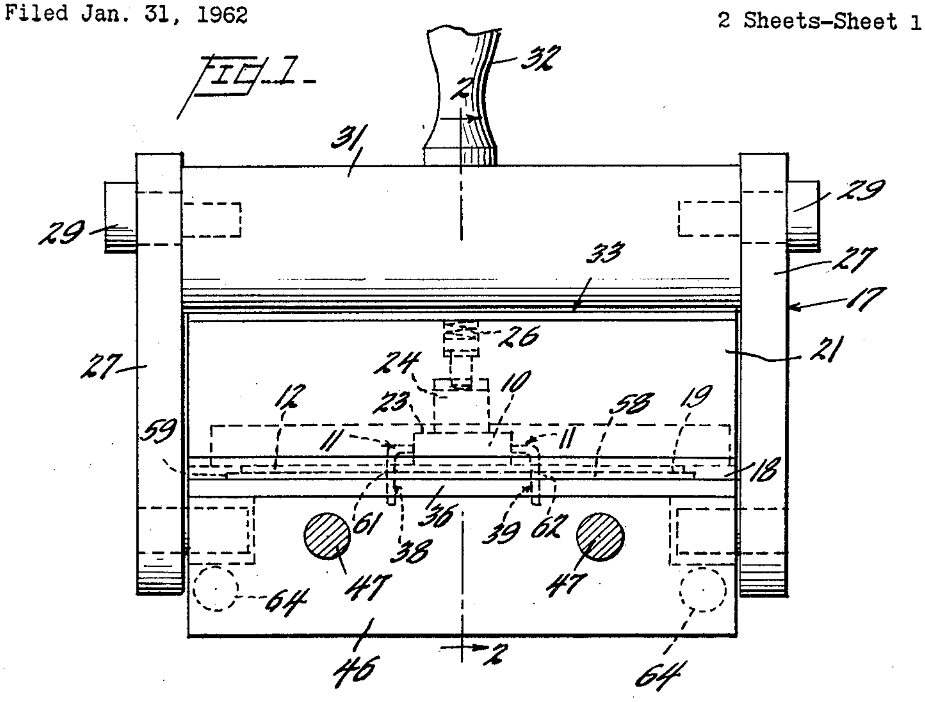
FIG. 1 is a partially sectioned elevational view of one end of an apparatus for cutting and crimping terminal lead wires according to the principles of the invention.
Figure 2:
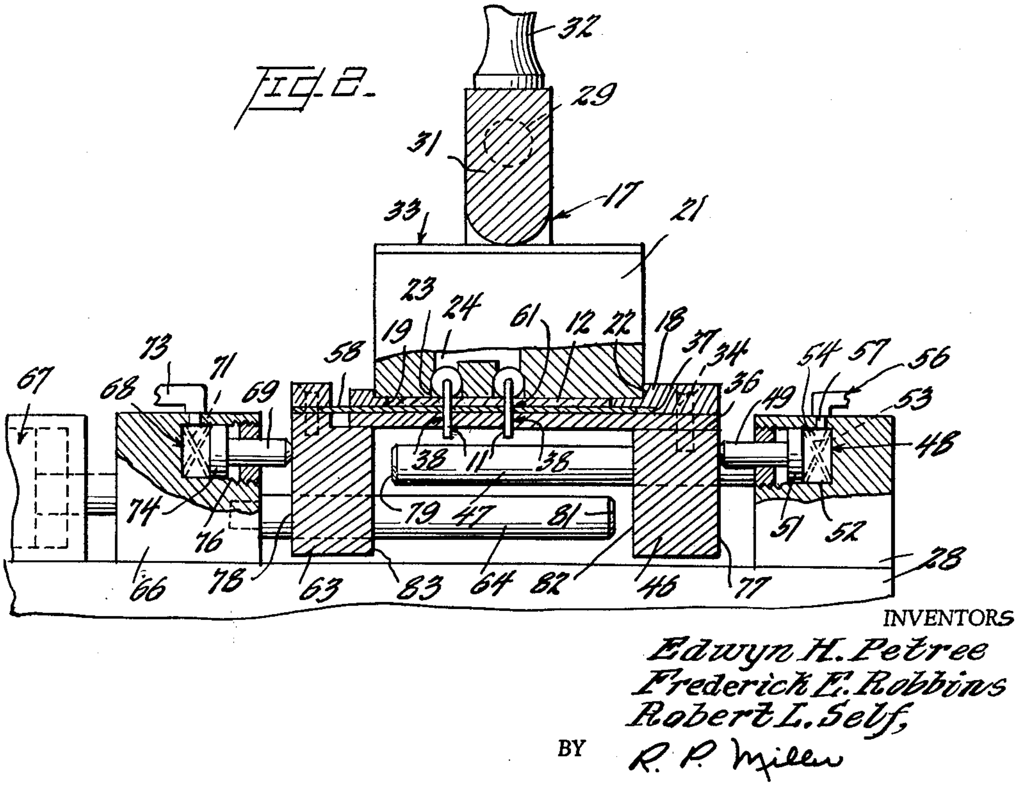
FIG. 2 is a cross-sectional side elevational view taken along line 2—2 of FIG. 1 showing a pair of overlying cutting and crimping slides mounted for successive relative movement on a pair of guide rods.

Attention is now directed to FIGS. 1 and 2, where the apparatus for forming the pairs of terminal lead wires 11 is shown including a clamp or holder mechanism 17 for mounting the components 10 on the panel 12 with the pairs of terminal lead wires 11 extending through the pairs of apertures 13. The holder mechanism 17 includes a frame 18 having an opening 19 for receiving the panel 12. A clamp block 21 mounted in a cutout section 22 of the frame 18 maintains the panel 12 in the frame opening 19. A series of recesses 23 formed in the clamp block 21 maintain a series of components 10 in spaced relationship with the pairs of lead wires 11 extending through the pairs of panel apertures 13. A fixture 24 mounted in the recesses 23 is urged downwardly (as viewed in FIGS. 2 and 3) by a spring 26 against the spaced components 10 to hold the components against the panel 12.

Spaced columns 27 are secured to a base 28 for mounting stub shafts 29 in spaced relationship. A cam 31 interposed between the columns 27 is mounted for rotation on the stub shafts 29. A handle 32 secured to the cam 31 may be moved into a vertical position for rotating the cam against the upper surface 33 of the clamp block 21. When the components 10 have been mounted on the panel 12 and the clamp block 21 placed on the frame 18 over the mounted components, the handle is moved into the vertical position to rotate the cam 31 whereupon the cam advances against the upper surface 33 of the clamp block 21 and maintains or clamps the block 21 against the frame 18.

The frame 18 is secured by fasteners 34 to a plate or lower slide 36 so that there is a space 37 between the panel 12 and the lower slide. Each pair of terminal lead wires 11 extends through a pair of tools, such as cutting or shearing dies 38 and 39 formed in the lower slide 36 and provided with apertures or slots 41 and 42, respectively (FIGS. 3, 4 and 5), having respective cutting surfaces 43 and 44 formed thereon. A downwardly extending section 46 of the lower slide 36 is slidably mounted on a pair of fixed guide rods or bars 47 that are secured to and extend horizontally from the base 28.

To the right of the slide section 46 (as viewed in FIG. 2), a first releasable stop mechanism 48 is mounted in the base 28. A piston rod 49 secured to a piston 51 slidably mounted in a cylinder 52 extends from the cylinder into engagement with the lower slide section 46. A releasable device such as a spring 53 (indicated in dotted lines in FIG. 2) or hydraulic fluid 54 of a hydraulic system 56 is provided in the cylinder to maintain the piston 51 and therefore the lower slide 36, releasably locked in a fixed position on the fixed guide rods 47 until a predetermined force is applied to the lower slide. Upon application of such force, the spring 53 is compressed or the hydraulic fluid 54 is forced through a variable orifice 57 into the hydraulic system 56 to permit the piston 51, and therefore the lower slide 36 to advance to the right as viewed in FIG. 2.

Referring to FIG. 1, an upper slide 58 is shown mounted in a slot 59 formed in the frame 18 for movement in the space 37 between the panel 12 and the lower slide 36. Each pair of terminal lead wires 11 that extends through the panel 12, extends through a pair of forming tools such as crimping dies 60 provided in the upper slide 58 (FIG. 3). A section 63 of the upper slide 58 extends downwardly and is slidably mounted on a pair of movable guide rods or bars 64. The movable pair of guide rods 64 is mounted on and extend from a ram 66. A pneumatic motor 67 is provided for sliding the ram 66 in a reciprocatory path on the base 28 for moving the movable guide rods 64.

A second releasable stop mechanism 68 similar to the first stop mechanism 48 is mounted on the ram 66 for releasably precluding relative movement between the ram and the upper slide 58. Thus, until a predetermined force acts in a leftward direction on the section 63 of the upper slide 58, a predetermined advancement of the ram 66 to the right will effectuate an equal advancement of the upper slide to the right. However, upon application of the predetermined leftwardly acting force to the upper slide section 63, a piston rod 69 of the releasable stop mechanism 68 overcomes the force of a second spring 71 (or the fluid of a second hydraulic system 73) which act on a piston 74. Relative movement between the piston 74 and a second cylinder 76 of the ram is thereby permitted so that as the ram continues to advance to the right, the piston rod 69 and the upper slide 58 may remain stationary with respect to the base 28.

Appreciation of the relative movements of the upper and lower slides 58 and 36 during a forming operation may be had upon reference to FIG. 2, wherein the forming apparatus is shown in position to commence the forming operation. At this time, the piston rods 49 and 69 are in engagement with the respective outer sides 77 and 78 of the lower and upper slide sections 46 and 63. Also, the ends 79 and 81 of the two pairs of guide rods 47 and 64, are spaced by a predetermined distance from the respective inner (or opposite) sides 82 and 83 of the lower and upper slide sections 46 and 63. After the components 10 have been mounted on the panel 12 and the handle 32 actuated to clamp the panel on the frame 18, the pneumatic motor 67 is actuated. Actuation of the pneumatic motor 67 initially advances the ram 66 to the right through the predetermined distance. The piston rod 69 of the second releasable stop mechanism 68 is moved to the right by the ram 66 for advancing the upper slide 58 a distance equal to the predetermined distance. During this advance of the upper slide 58, the lower slide 36, the frame 18, and thus the panel 12, are maintained fixed by the first releasable stop mechanism 48. Thus, there is a first relative movement between the lower and upper slides 36 and 58 during which the first lead 14 of each of the pair of terminal leads 11 is cut and crimped in a first direction by the cutting and crimping dies 38 and 60.

Upon completion of this cutting and crimping, the section 63 of the upper slide 58 engages the ends 79 of the fixed guide rods 47 whereupon the motion of the upper slide is halted. Concomitantly with the upper slide section 63 engaging the fixed guide rods 47, the ends 81 of the movable guide rods 64 are advanced into engagement with the side 82 of the lower slide section 46.

Upon further advancement of the ram 66, the piston rod 69 is forced against the now stopped upper slide 58 and overcomes the force of the spring 71. The ram 66 is thereby permitted to advance to the right relative to the upper slide 58 and advances the movable guide rods 64 to urge the lower slide section 46 against the piston rod 49. The piston rod 49 overcomes the spring 53 and releases the stop mechanism 48 to permit the lower slide 36, the frame 18, and the panel 12 to advance to the right under the action of the movable guide rods 64. Thus, there is a second relative movement between the upper slide 58 and the lower slide 36 during which the second lead 16 of each of the pairs of terminal leads 11 is cut and crimped in a second or opposite direction. The pneumatic motor 67 is then reversed and the apparatus restored to the original position for unloading the panel 12 to condition the apparatus for the next forming operation.

Referring to FIG. 3, one pair of cutting dies 38 and 39 is shown underlying one of the pairs of crimping dies 60. In FIG. 5, one of the cutting dies 38 is shown including the aperture 41 formed in the lower slide 36. The upper end of the aperture 41 (FIG. 5) is provided with the cutting surface or edge 43 which is hardened and acts as one member of a first shear-type cutting couple 84. A first crimping die 61 of the pairs of crimping dies 60 is also shown including a hardened edge or surface 86 provided on a crimping section 87 which acts as the other member of the shear-type cutting couple 84. The crimping section 87 is arranged to crimp a lead wire 11 that has been cut by the cutting couple 84. The crimping die 61 further includes a lip 88 that is provided with a bevelled edge 89 for engaging and retaining lead wire 11 in a crimped configuration.

In FIG. 4, the other cutting die 39 is shown including the aperture 42 formed in the lower slide 36. The upper end of the aperture 42 is similarly formed with the hardened cutting surface or edge 44 which acts as one member of a second shear-type cutting couple 91. The other crimping die 62 is also shown including a slot or elongated aperture 92 at one end and a forming or crimping section 93 at the other end. One edge 94 of the forming section 93 is hardened and acts as the second member of the second shear-type cutting couple 91.

With the two relative movements of the upper and lower slides 36 and 58 in view, along with the description of the cutting dies 38 and 39 and the crimping dies 61 and 62, reference is now made to FIGS. 6A through 6C and FIGS. 7A through 7C for a description of the forming operation. In FIGS. 6A and 7A, the upper and lower slides 36 and 58 are shown in the initial position prior to commencement of the forming operation. The components 10 are mounted on the panel 12 with the first terminal lead wire 14 extending through the aperture 13, the crimping die 61, and the cutting die aperture 41; and the second lead wire 16 extending through the aperture 13, the crimping die 62, and the cutting die aperture 42.

Referring to FIGS. 6B and 7B, upon actuation of the pneumatic motor 67, the first relative movement occurs wherein the upper slide 58 advances to the right relative to the panel 12 and the lower slide 36, both of which remain stationary. In FIG. 6B, the slot 92 is shown advanced to the right and receives the lead wire 16. In FIG. 7B, the cutting die aperture 41 is shown maintaining a lower section 96 of the lead wire 14 stationary so that the shearing edge 86 in moving relative to the shearing edge 43 cuts the lead wire 14. The upper section 98 of the lead wire 14 is similarly held stationary by the panel 12 so that a middle section 97 of the lead wire 14 is crimped in a first direction as the crimping die 61 advances to the right relative to the aperture 13. The crimped section 97 is forced against the lower surface 106 of the panel 12 to preclude removal of the lead wire 14 from the panel aperture 13.

Referring to FIG. 6C, the second relative movement is shown completed for forming the second lead wire 16. At the start of the second relative movement, the upper slide 58 is maintained stationary in its advanced position and the panel 12 and the lower slide 36 are advanced to the right. The panel 12 and the lower slide 36 act on the upper section 103 and the lower section 101 of the second lead wire 16 and move the wire 16 relative to the now fixed shearing edge 94 of the crimping die 62 for cutting the lower section 101 of the lead wire 16. As the panel 12 and the lower slide 36 advance further, the middle section 102 of the lead wire 16 engages the crimping section 93 of the die 62. The crimping section 93 bends and crimps the lead wire section 102 opposite to the direction of the lead wire 14 against the lower surface 106 to lock the component on the panel 12.

Additionally, referring to FIG. 7C, as the panel 12 and the lower slide 36 advance to the right, the first crimped section 97 moves over the crimping section 87 and engages the bevelled edge 89 of the lip 88. The lip 88 applies an additional crimping force to the first crimped section 97 to preclude uncrimping thereof while the second section 102 is being crimped.

When both middle sections 97 and 102 of each pair of lead wires 11 attached to each component 10 have been crimped to secure and lock the components on the panel 12, the slides 36 and 58 are restored to the original position whereafter the panel 12 is removed from the frame 18 to condition the apparatus for a subsequent forming operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for forming a pair of lead wires extending from a component, first slide means having a pair of dies for crimping said component lead wires, second slide means provided with a pair of dies for shearing said component lead wires, means secured to the second slide means for holding a component so that the lead wires extend through the crimping dies and into the shearing dies, and means for successively advancing the first and then the second slide means relative to each other to shear and crimp the lead wires in succession.

2. In a mechanism for shearing and crimping a pair of legs extending from the ends of a component through a module, first slide means having spaced dies for crimping the pair of legs, second slide means movable on one side of the first slide means and provided with spaced apertures for shearing the pair of legs, means movable with the second slide means for mounting the module on the other side of the first slide means so that a leg projects through each die and into each aperture, and means for alternately advancing the first slide means relative to the second slide means and then advancing the second slide means relative to the first slide means to shear and bend the legs in opposite directions in succession.

3. In an apparatus for crimping a pair of lead wires extending from a component, means provided with a pair of spaced edges for shearing said lead wires, means provided with a pair of spaced edges for crimping said lead wires, means mounted on the shearing means for holding the component with the lead wires extending between the spaced edges on said crimping and shearing means, means for advancing the crimping means to move a first crimping edge against a first lead wire to shear and crimp the first lead wire, and means actuated by the advancing means upon completion of the shearing and crimping of the first lead wire for moving the shearing means relative to the crimping means to move a second lead wire against a second crimping edge to shear and crimp the second lead wire.

4. In an apparatus for securing a component to a panel, means provided with dies for severing lead wires extending from the components, means provided with dies for crimping several lead wires against the panel, means mounted on the severing means for holding the panel with the lead wires extending into the severing and crimping means, means for advancing the crimping means relative to the shearing means to shear and crimp a first lead wire, means for engaging and interrupting the advance of the crimping means, and means engaged by the advancing means upon interruption of the crimping means for moving the severing means relative to the crimping means to sever and crimp a second lead wire to secure the component to the panel.

5. In an apparatus for shearing and crimping lead wires extending from a component, means provided with a die for crimping each wire, means provided with a slot for shearing each lead wire, first means for releasably maintaining the shearing means fixed against movement, means for moving the crimping means to shear and crimp a first lead wire, said moving means including a second means for releasably maintaining the crimping means connected to the moving means for movement therewith, and means cooperating with the moving means for simultaneously overcoming the first and second releasable means to move the shearing means relative to the crimping means to shear and bend a second lead.

6. In an apparatus for shearing and bending a pair of leads depending from a circuit mounting, a slidably mounted frame for said circuit mounting, a first slide mounted under said frame and spaced therefrom, a second slide interposed between said first slide and said frame having a pair of dies formed therein to receive said leads and shaped to bend the leads in opposite directions, said first slide having a pair of dies formed therein to receive the leads and cooperate with the dies in said second slide to shear the leads, means for imparting a first relative movement between said frame and the first slide and said second slide to shear and bend a first of said leads, and means for imparting a second relative movement between said second slide and the frame and said first slide to shear and bend a second of said leads in a direction opposite to the direction of bend of the first lead.

7. In an apparatus for shearing and crimping a pair of lead wires extending from a component, a movable slide provided with a crimping die for each lead wire, a movable plate provided with a shearing slot for each lead wire, first means for resiliently maintaining the plate fixed against movement, means for moving the slide to shear and crimp a first lead wire, said moving means including a second means for resiliently maintaining the slide connected to the moving means for movement therewith, and means cooperating with the moving means for simultaneously overcoming the first and second releasable means to stop the crimping slide and move the plate relative to the slide to shear and crimp a second lead wire.

8. In a mechanism for shearing and crimping a pair of terminal leads extending through a terminal board, an upper slide having a pair of crimping dies, a lower slide underlying the upper slide and provided with a pair of shearing dies, means fixed to the lower slide for maintaining the terminal board in spaced overlying relationship with the upper and lower slides so that a terminal lead extends through each crimping die and into each shearing die, means for releasably holding the lower slide against movement, advancing means for moving the upper slide to shear and crimp a first terminal lead, means for releasing the upper slide from the advancing means to preclude further movement of the upper slide, means mounted on the advancing means for overcoming the holding means concomitantly with the release of the upper slide to move the lower slide and shear and crimp a second of the terminal leads.

9. In an apparatus for shearing and crimping a wire extending from one end of an article through an aperture provided in a board, a slide provided with a forming die, a plate provided with a shearing die, a holder secured to the plate for mounting the board so that the wire extends from the article through the aperture and the forming die into the shearing die, said forming die having a primary forming surface at one end and a secondary forming surface at the other end, releasable means for holding the plate fixed against movement, drive means for advancing the slide to move the primary forming surface against the wire to shear and crimp the wire, means for interrupting the advance of the slide, and means for overcoming the holding means to move the plate so that the crimped wire advances onto the secondary forming surface to preclude uncrimping of the wire.

10. In a mechanism for cutting and crimping a lead wire extending through a terminal board, a slide having a first die provided with a cutting and crimping section, a plate underlying the first slide and having a second die forming a cutting couple with said cutting section, means movable with the plate for holding the terminal board in overlying relationship with the slide so that the lead wire extends through said first and second dies, means for biasing the plate against movement, means for advancing the slide to cut the lead wire with the cutting couple and crimp the lead wire on the crimping section, means actuated by the advancing means for overcoming the biasing means to move the plate and the terminal board, means for interrupting advancement of the slide concomitantly with commencement of movement of the plate, and a crimping lip projecting from the first die for applying an additional crimping force to the crimped terminal as the terminal board moves with the plate.

11. In an apparatus for locking a component to a panel wherein the component is provided with first and second lead wires that extend from the ends thereof through the panel, a slide provided with a first crimping die having a first crimping surface at one end and a crimp retaining lip at the other end, said slide provided with a second crimping die having a slot and a second crimping surface, a plate provided with means for holding a panel so that the first and second wires extend through the respective first and second dies, means for advancing the slide with its first crimping surface and slot to crimp the first lead wire and move the slot around the second wire, means for interrupting the advance of the slide, resilient means rendered ineffective upon said interruption for holding the plate against movement, and means rendered effective upon rendering the resilient means ineffective for moving the plate to crimp the second wire on the second crimping surface and advance the first wire onto the lip to preclude uncrimping thereof.

12. In an apparatus for cutting and crimping pairs of terminal lead wires extending from electrical components to secure the components to a panel, a slide mounted for reciprocatory movement and having spaced dies for crimping lead wires, a plate movable parallel to the slide and having spaced dies for cutting lead wires, a holder secured to the plate for clamping the panel in overlying relationship with the slide to permit the pairs of lead wires to extend through the crimping dies into the cutting dies, means for advancing the slide relative to the plate to cut and crimp a first wire of each pair of lead wires, a bar interposed in the path of advancement of the slide for supporting the plate for movement and interrupting the advance of the slide, and a rod moved by the advancing means for supporting the slide and moving the plate on the bar to cut and crimp the second wire of each pair of lead wires and secure the component to the panel.

13. In an apparatus for shearing and crimping lead wires extending from the ends of components, a frame, a movable plate having a plurality of edges for shearing lead wires, releasable stop means interposed between the frame and the plate for selectively precluding movement of the plate relative to the frame, a slide having a plurality of dies for crimping sheared lead wires, an elongated member for supporting the slide for movement, means for moving the member into engagement with the plate to release the stop means and advance the plate to shear and crimp the lead wires extending from one end of the components, resilient means interposed between the moving means and the slide for advancing the slide relative to the plate to shear and crimp the lead wires extending from the other ends of the components, and means interposed between the frame and the slide for supporting the plate for movement and overcoming the resilient means to stop the slide and permit the plate to advance relative to the slide.

14. In a mechanism for securing a component to a module provided with spaced apertures, said component having a body section on one side of the module and legs extending from the body section through the apertures to the other side of the module, a plate provided with spaced slots, means for mounting the module in spaced relationship with the plate so that the legs extend into the slots, a slide movable in the space between the module and the plate, said slide having dies cooperable with the slots, stop means for releasably maintaining the plate fixed, means for advancing the slide in the space to cut and bend the first leg, means for interrupting the advance of the slide, and means actuated by the advancing means for releasing the stop means to move the plate and the module relative to the slide and shear and bend the second leg.

15. In an apparatus for shearing and forming a pair of lead wires extending from a component; a frame having a pair of horizontally extending guide rods; a first slide means mounted on the guide rods for reciprocatory movement; said first slide having a pair of spaced shearing dies formed therein; a second slide means mounted on the first slide means for reciprocatory movement; said second slide means having a first shearing and crimping die formed therein and positioned to cooperate with a first shearing die formed in the first slide means, said first shearing and crimping die including a first elongated slot with a recessed forming section having a shearing edge and a crimping surface extending from one end and a recessed lip having a bevelled edge for retaining the first lead wire in a crimped position extending from the other end, said lip being spaced from the forming section to permit a lead wire to pass therebetween, said second slide means having a second shearing and crimping die formed therein and positioned to cooperate with the second shearing die formed in the first slide means, said second shearing and crimping die including a second elongated slot with a recessed forming section extending from one end, said forming section having a shearing edge and a crimping surface; means secured to the second slide means for holding a component so that the first lead wires extend through the first slot and between the lip and the forming section of the first shearing and crimping die and into the first shearing die and the second lead wire extends through the second slot past the forming section of the second shearing and crimping die and into the second shearing die; and means for successively advancing the second and then the first slide means relative to each other to shear and crimp the lead wires in succession.

References Cited in the file of this patent

UNITED STATES PATENTS

| | | |
|---|---|---|
| 2,893,010 | Stuhre | July 7, 1959 |
| 3,062,245 | Liebscher | Nov. 6, 1962 |